(12) United States Patent
Wadehn

(10) Patent No.: US 9,766,612 B2
(45) Date of Patent: Sep. 19, 2017

(54) NUMERICALLY CONTROLLED WORKPIECE PROCESSING APPARATUSES AND RELATED METHODS

(71) Applicant: TRUMPF Laser- und Systemtechnik GmbH, Ditzingen (DE)

(72) Inventor: Wolf Wadehn, Nussdorf (DE)

(73) Assignee: TRUMPF Laser- und Systemtechnik GmbH, Ditzingen (DE)

( * ) Notice: Subject to any disclaimer, the term of this patent is extended or adjusted under 35 U.S.C. 154(b) by 978 days.

(21) Appl. No.: 14/039,214

(22) Filed: Sep. 27, 2013

(65) Prior Publication Data

US 2014/0025191 A1 Jan. 23, 2014

Related U.S. Application Data

(63) Continuation of application No. PCT/EP2012/054893, filed on Mar. 20, 2012.

(30) Foreign Application Priority Data

Mar. 30, 2011 (DE) .................. 10 2011 006 447

(51) Int. Cl.
*G05B 19/402* (2006.01)
*B23K 26/04* (2014.01)
(Continued)

(52) U.S. Cl.
CPC .......... *G05B 19/402* (2013.01); *B23K 26/048* (2013.01); *B23K 26/0876* (2013.01); *G05B 19/4083* (2013.01); *G05B 2219/37573* (2013.01)

(58) Field of Classification Search
None
See application file for complete search history.

(56) References Cited

U.S. PATENT DOCUMENTS 4,659,900 A 4/1987 Gilli et al.
6,325,697 B1 * 12/2001 Gottschalk .............. B24B 9/148
451/11
(Continued)

FOREIGN PATENT DOCUMENTS

CN 1540466 A 10/2004
CN 101109944 A 1/2008
(Continued)

OTHER PUBLICATIONS

Notification of Transmittal of Translation of the International Preliminary Report on Patentability for corresponding PCT Application No. PCT/EP2012/054893, mailed Oct. 10, 2013, 9 pages.
(Continued)

*Primary Examiner* — Sean Shechtman
(74) *Attorney, Agent, or Firm* — Fish & Richardson P.C.

(57) ABSTRACT

A method of processing structurally identical workpieces using a numerically controlled workpiece processing apparatus includes processing a first workpiece according to a first desired tool path specified for a tool of the numerically controlled workpiece processing apparatus by closed-loop controlling a working distance between the tool and the workpiece to achieve a defined desired distance, such that when processing the first workpiece, the tool is moved along a distance-controlled actual tool path. The method further includes optimizing the first desired tool path for a second workpiece based on the distance-controlled actual tool path of the first workpiece to provide a second desired tool path and processing the second workpiece according to the second desired tool path.

22 Claims, 2 Drawing Sheets

(51) Int. Cl.
B23K 26/08 (2014.01)
G05B 19/408 (2006.01)

(56) References Cited

U.S. PATENT DOCUMENTS

| 2005/0107918 A1* | 5/2005 | Watanabe | B25J 9/1684 |
|---|---|---|---|
| | | | 700/245 |
| 2009/0132080 A1* | 5/2009 | Glasser | B23Q 15/22 |
| | | | 700/105 |

FOREIGN PATENT DOCUMENTS

| CN | 101169644 A | 4/2008 |
|---|---|---|
| DE | 4330845 C1 | 12/1994 |
| DE | 19840801 A1 | 3/2000 |
| DE | 102005039094 A1 | 2/2007 |
| EP | 0348531 A1 | 1/1990 |

OTHER PUBLICATIONS

International Search Report for corresponding PCT Application No. PCT/EP2012/054893, mailed May 29, 2012; 4 pages.

* cited by examiner

NUMERICALLY CONTROLLED WORKPIECE PROCESSING APPARATUSES AND RELATED METHODS

CROSS REFERENCE TO RELATED APPLICATIONS

This application is a continuation of and claims priority under 35 U.S.C. §120 to PCT Application No. PCT/EP2012/054893 filed on Mar. 20, 2012, which claims priority to German Application No. 10 2011 006 447.8, filed on Mar. 30, 2011. The contents of both of these priority applications are hereby incorporated by reference in their entirety.

TECHNICAL FIELD

This disclosure relates to processing workpieces using numerically controlled (NC) workpiece processing apparatuses and related methods.

BACKGROUND

Processing a workpiece may be performed by controlling the position and movement of a tool relative to the workpiece using a numerical control (NC) device. During processing of the workpiece, the tool is moved relative to the workpiece along a tool path that is typically generated according to computer-aided design (CAD) or computer-aided manufacturing (CAM) data related to a desired geometry of the workpiece. The tool path is encoded by path-describing NC data that are stored in the NC device and processed by an NC program to process the workpiece.

Often times, a geometry of the processed workpiece deviates from the CAD geometry (i.e., the desired geometry). For example, workpieces that have undergone a forming process (e.g., deep-drawn workpiece parts) may exhibit relatively large inaccuracies that make it difficult to process the workpieces along a fixed, desired tool path specified by the NC device.

In an example of processing a workpiece using a laser processing apparatus, a laser processing head of the laser processing apparatus must maintain a constant working distance (e.g., 1 mm) from the workpiece. However, since the workpiece inaccuracies are often larger than the working distance, the particular working distance between the laser processing head and the workpiece to be processed is measured using a distance measuring device. The distance measuring device is typically integrated with the laser processing head. The working distance is then regulated by the NC device such that the working distance is set to a specified desired distance based on the measured distance values. That control loop is superimposed on the motion control of the laser processing head along the desired tool path specified by the NC device. Such superposition is referred to as distance control.

The value of a regulation parameter generally depends on a deviation of the manipulated variable from a desired value. Values of the regulation parameters are generally relatively low, with the result that relatively large inaccuracies of the workpiece can have a negative effect on the processing. If the workpiece inaccuracies exceed a certain magnitude, the distance control is unable to correct the difference sufficiently, which may result in collisions between the tool and the workpiece and termination of the process. In such cases, the desired tool path specified by the NC program may need to be corrected manually. Correcting the tool path may take place during essential operating time of the workpiece processing apparatus and therefore be costly to the process.

SUMMARY

The present disclosure provides a method and a workpiece processing apparatus (e.g., a numerically controlled workpiece processing apparatus) for processing structurally identical workpieces. The method enables a desired tool path specified for processing a workpiece to be optimized in a simple and efficient manner in order to process another (e.g., a next) workpiece. The method further permits a simple assessment of the workpiece quality of the processed workpiece. The method may be implemented by existing workpiece processing apparatuses, such as laser processing apparatuses (e.g., laser flatbed machines, punching/laser combination machines, or robots).

In one aspect of the invention, a method of processing structurally identical workpieces using a numerically controlled workpiece processing apparatus includes processing a first workpiece according to a first desired tool path specified for a tool of the numerically controlled workpiece processing apparatus by closed-loop controlling a working distance between the tool and the first workpiece to achieve a defined desired distance, such that when processing the first workpiece, the tool is moved along a distance-controlled actual tool path. The method further includes optimizing the first desired tool path for a second workpiece based on the distance-controlled actual tool path of the first workpiece to provide a second desired tool path and processing the second workpiece according to the second desired tool path.

In another aspect of the invention, a workpiece processing apparatus includes a tool and a distance measuring device associated with the tool and configured to measure a working distance between the tool and a workpiece. The workpiece processing apparatus further includes a numerical control (NC) device programmed to execute a method including processing a first workpiece according to a first desired tool path specified for the tool by closed-loop controlling the working distance between the tool and the first workpiece to achieve a defined desired distance, such that when processing the first workpiece, the tool is moved along a distance-controlled actual tool path. The method further includes optimizing the first desired tool path for a second workpiece based on the distance-controlled actual tool path of the first workpiece to provide a second desired tool path and processing the second workpiece according to the second desired tool path.

In some embodiments, the method further includes detecting axial positions of the tool along and/or about motion axes of the tool as the tool is moved along the distance-controlled actual tool path and determining the distance-controlled actual tool path based on the axial positions.

In certain embodiments, the second desired tool path is optimized such that the second desired tool path corresponds to the distance-controlled actual tool path along which the tool moved during processing of the first workpiece.

In some embodiments, the first and second desired tool paths are optimized in a manner such that the first and second desired tool paths are encoded by a number and/or spatial sequence of path interpolation points that are based on an operationally optimized motion of the tool.

In certain embodiments, the first and second desired tool paths are optimized automatically via a numerical control (NC) device.

In some embodiments, the method further includes determining a path deviation between the distance-controlled actual tool path and the first desired tool path and optimizing the first desired tool path.

In certain embodiments, the method further includes assessing a workpiece quality of the first workpiece based on the path deviation.

In some embodiments, the method further includes determining a path deviation trend from multiple path deviations.

In certain embodiments, the method further includes graphically displaying the path deviation trend.

In some embodiments, the method further includes graphically displaying a virtual workpiece image that is generated from computer-aided (CAD) design data related to the first workpiece and stored in a control system of the numerically controlled workpiece processing apparatus and/or graphically displaying at least a portion of the first desired tool path and/or the distance-controlled actual tool path.

In certain embodiments, the working distance between the tool and the first workpiece is measured in a non-contacting manner.

In some embodiments, the working distance between the tool and the first workpiece is measured optically or capacitively.

In certain embodiments, the method further includes assessing a workpiece quality of the first workpiece based on the distance-controlled actual tool path.

In some embodiments, the workpiece processing apparatus is a laser processing apparatus, and the tool is a laser tool.

In certain embodiments, the NC device is configured to optimize the second desired tool path such that the second desired tool path corresponds to the distance-controlled actual tool path along which the tool moved during processing of the first workpiece.

In some embodiments, the NC device is configured to optimize the first and second desired tool paths in a manner such that the first and second desired tool paths are encoded by a number and/or spatial sequence of path interpolation points that are based on an operationally optimized motion of the tool.

In certain embodiments, the NC device is configured to automatically optimize the first and second desired tool paths.

In some embodiments, the distance measuring device is a non-contact sensor.

In certain embodiments, the distance measuring device is an optical or capacitive sensor.

Processing of the workpieces is carried out according to active distance control of the working distance between the tool and the workpiece according to the desired tool path specified by the control system. The desired tool path is optimized based on a distance-controlled actual tool path along which the tool moved during processing of a previously processed workpiece (e.g., a workpiece that was last processed). Accordingly, the actual geometry of the previously processed workpiece is reproduced or taken into account in the optimized desired tool path. The specified desired tool path may be a native desired tool path that is encoded by an NC data set programmed in the control device. That NC data set may, for example, have been generated from CAD data relating to a desired geometry of the workpieces. Alternatively, the NC data set may also provide a desired tool path that has already been optimized one or more times during processing of workpieces. That desired tool path is then encoded accordingly in the control device a path-encoding NC data set that has already been modified.

Workpieces often exhibit similar deviations within a batch (e.g., the workpieces exhibit systematic geometric errors that may have been caused, for example, by tool wear of a deep-drawing die). Accordingly, subsequent processing of the next one or more workpieces may be carried out via the NC program by specifying the previously optimized desired tool path for workpieces that are structurally identical to the workpiece to be processed. In this manner, the distance control may be implemented with significantly fewer corrections, providing for a better workpiece processing result and a process that is less prone to failure. Furthermore, dynamics of the superimposed distance control can be reduced during processing of the workpieces, and therefore, auxiliary devices (e.g., highly dynamic auxiliary axes of the tool) may not be needed to carry out the distance control. Implementing the workpiece processing apparatus without such auxiliary devices may be advantageous with respect to design engineering and may provide for operation of the processing device in a manner that is less prone to failure.

Moreover, the workpiece may not need to be removed from the processing device to be subsequently measured, providing for a simplified process that is less time-consuming and less costly in other respects. By assessing the workpiece quality based on the distance-controlled actual tool path, workpieces that exhibit a defective geometry that is outside of a certain error tolerance range can be recognized, and appropriately rejected within a good time (e.g., during processing of the workpiece). In this manner, the workpiece may be processed without carrying out a time-consuming, separate quality control process or other unnecessary processing and manufacturing steps, thereby providing a cost advantage.

Workpiece processing can be improved further by optimizing the desired tool path for processing one or more next workpieces in the same manner as that which was used to process the previously processed workpiece. The one or more next workpieces are accordingly each processed by specifying a desired tool path that has been optimized for processing the previous workpiece. In this manner, the workpiece processing can simply and precisely compensate for geometric errors (e.g., dynamic geometric errors) that may be generated in the workpieces over time and that may be caused by, for example, progressive wear of a forming tool used upstream of the workpiece processing.

During processing of the workpiece, axial positions (e.g., absolute positions) of the tool along and/or about motion axes are detected and used to determine the actual tool path. For a numerically controlled workpiece processing apparatus, the axial positions are closed-loop control parameters and are present in the control system or are easily detected by existing sensors of the workpiece processing apparatus.

In the simplest case, the desired tool path is optimized such that it corresponds to the actual tool path of the tool during processing of the previously processed workpiece. Processing the workpiece in such a manner saves time and effort that would otherwise be required for computing the optimized tool path, which may be especially beneficial in cases of high or maximum processing rates. In this respect, axial positions of the tool along and/or about the motion axes may, for example, be used at least in part as axial positions of the tool during processing according to the optimized desired tool path.

In the case where the detected axial positions lead to an unfavorable combination of interpolation point sequences of the desired tool path, the desired tool path can be modified (e.g., via an optimization algorithm of the NC device) in such a manner that the tool is moved at an optimized (e.g., as fast as possible) speed during processing of the workpiece according to the desired tool path. For this purpose, it is possible, for example, for individual axial positions of the path interpolation points to be thinned out, modified, and/or at least partially smoothed. In this manner, processing time can be conserved. In some examples, the path interpolation points refer those points of the desired tool path that are encoded in the NC device.

In some embodiments, the desired tool path is in each case optimized automatically by the NC device. Therefore, it is possible, for example, for the path-encoding NC data to be modified by the control device in accordance with a defined optimization algorithm. Alternatively or additionally, optimization of the desired tool path can also be carried out manually (e.g., via a graphical user interface of the NC device).

In certain embodiments, a path deviation of the actual tool path from the desired tool path is determined, and if there is a defined path deviation between the actual tool path and the desired tool path, the desired tool path is optimized. In this manner, it is possible to avoid unnecessary path corrections of the desired tool path when there are only slight path deviations. The defined path deviation may be provided by (e.g., correspond to) a path deviation interval that is defined according to specified production tolerances of the workpieces.

To assess the workpiece quality of a processed workpiece, a path deviation may be determined between the distance-controlled actual tool path and the desired tool path or between the distance-controlled actual tool path and the distance-controlled actual tool path of a previously processed workpiece. Accordingly, a maximum value for the path deviation may be specified, and if that maximum value is exceeded, the respective workpiece is identified as a reject. In the case where a workpiece has been identified as a reject and is therefore discarded, a next workpiece is processed according to the desired tool path that was specified for the previously processed workpiece (i.e., the tool path that was most recently implemented). Processing in this manner avoids deterioration of the desired tool path and any associated undesired reject production. Therefore, workpiece processing can be performed more efficiently and cost advantageously.

In some embodiments, a deviation trend is determined based on path deviations between the actual tool paths and the respective desired tool paths. Accordingly, increased wear of a forming tool used upstream of the workpiece processing can be easily recognized and enables preventive measures to be implemented before the workpiece deviates from a specified (e.g., geometrical) tolerance and before reject workpieces are produced. The deviation trend may be updated over time (e.g., after each workpiece processing operation is completed).

Since the distance control can take place at various processing sites along the workpiece, along various amplitudes of the workpiece, and in different directions in space, the path deviation trend may be output in graphical form (e.g., displayed on a monitor or the like). Such graphical display can enable an operator to visualize the information conveniently and to monitor the information in a simplified manner. A gradual change in the geometry of the processed workpieces (e.g., resulting from wear in a deep-drawing tool) can therefore be recognized reliably and before first rejects are produced and/or processed on the machine and detected only during a subsequent measuring operation (e.g., a quality control operation).

Monitoring the workpiece processing can be further improved by graphically displaying a virtual workpiece image generated from CAD data related to the workpieces to be processed and stored in the control system and/or graphically displaying at least a portion of the desired tool path and/or the actual tool paths.

The distance of the tool from the workpiece is may be measured in a non-contacting manner (e.g., optically and/or capacitively). Accordingly, the distance may be measured in an especially low-wear and less failure-prone manner. In the case of a capacitive distance measurement, measuring errors may occur due to accumulations of material in the corner regions of the workpiece. An analysis of the actual tool path travelled by the processing head during processing of the workpiece, combined with curvature information related to the corner regions of the workpiece, makes it possible to infer appropriate correction values and determine measures for minimizing the measuring errors.

Other aspects, features, and advantages will be apparent from the description, the claims, and the drawings. The features mentioned above and the features set forth hereinafter may be implemented individually or in a plural manner in any desired combination.

The disclosure is described in detail below with reference to an illustrative embodiment provided in the drawings. The embodiment shown and described is not to be understood as forming a definitive embodiment, but rather is an example embodiment. The drawings show the subject matter of the disclosure in a schematic form and are not drawn to scale.

DETAILED DESCRIPTION

Figure 1:
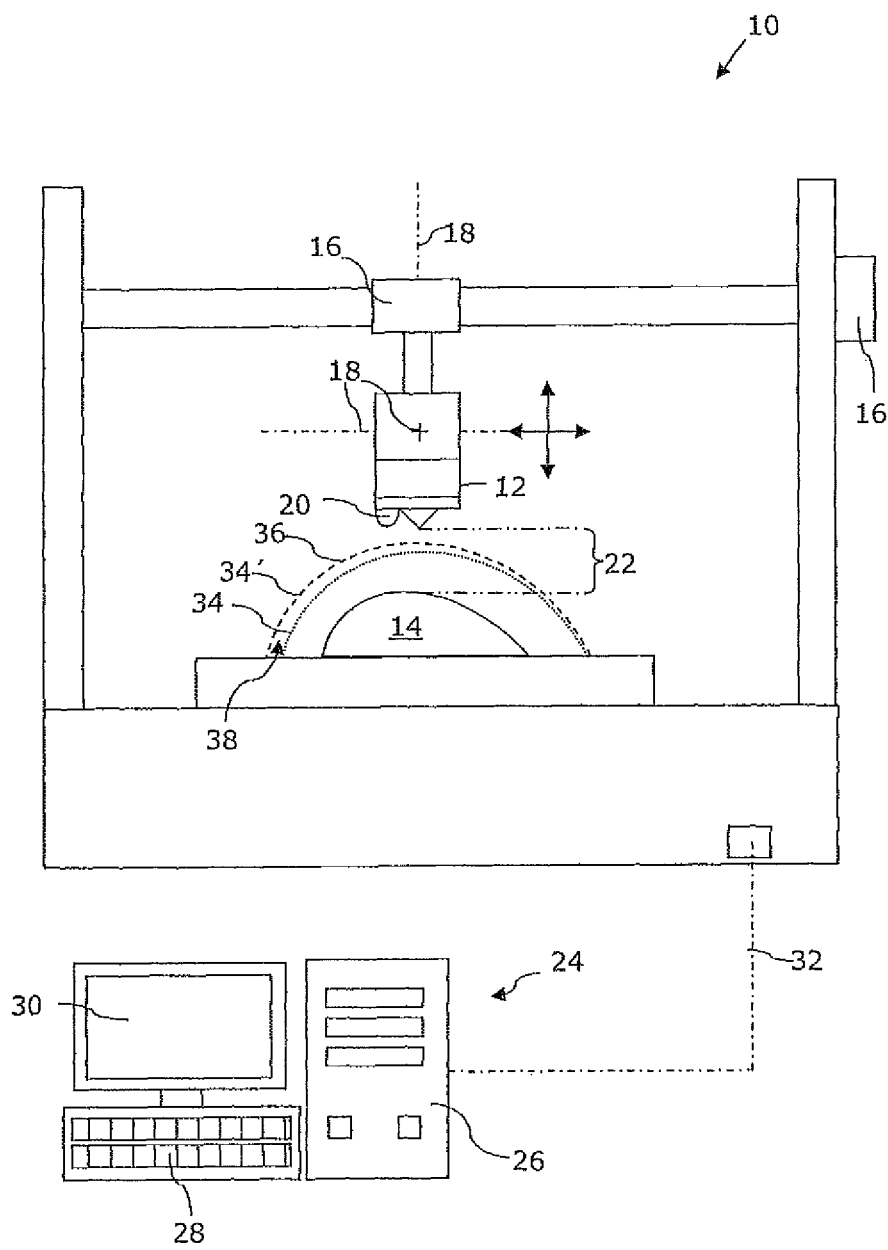
FIG. 1 illustrates a side view of a workpiece processing apparatus that includes a tool controlled by a numerical control device.

FIG. 1 illustrates a side view of a workpiece processing apparatus 10 (e.g., a laser processing apparatus) that includes a tool 12 (e.g., a laser). The tool 12 is movable relative to a workpiece 14 along and about multiple motion axes 18 via multiple actuators 16 (e.g., actuating motors) in order to process the workpiece 14. A distance measuring device 20 (e.g., an optical distance measuring device) disposed adjacent the tool 12 measures a working distance 22 of the tool 12 (e.g., a distance between the tool 12 and the workpiece 14). In some embodiments, the distance measuring device 20 may be a capacitive distance measuring device.

The workpiece processing apparatus 10 further includes a numerical control (NC) device 24 that includes a computer 26, an input unit 28 connected to the computer 26, and a monitor 30. The computer 26 is connected to the actuators 16 and to the distance measuring device 20 of the tool 12 via a control line 32. The computer 26 controls the motion of the tool 12 along a desired tool path 34 specified by the NC device 24 and regulates (e.g., closed-loop controls) the working distance 22 of the tool 12 to set or adjust the working distance 22 to a desired distance that is stored in the NC device 24.

In FIG. 1, the desired tool path 34 specified by the NC device 24 is illustrated by a dotted line. An actual tool path 36, along which the tool 12 is moved during the processing of the workpiece 14 according to control of the distance, is illustrated by a dashed line. In the example of FIG. 1, the actual tool path 36 of the tool 12 deviates from the desired tool path 34, as indicated by the arrow 38. The actual tool path 36 of the tool 12 provides (e.g., coincides with) an optimized desired tool path 34', along which the tool 12 is to be moved relative to the workpiece 14 during processing of a next workpiece that is structurally identical to the workpiece 14.

Figure 2:
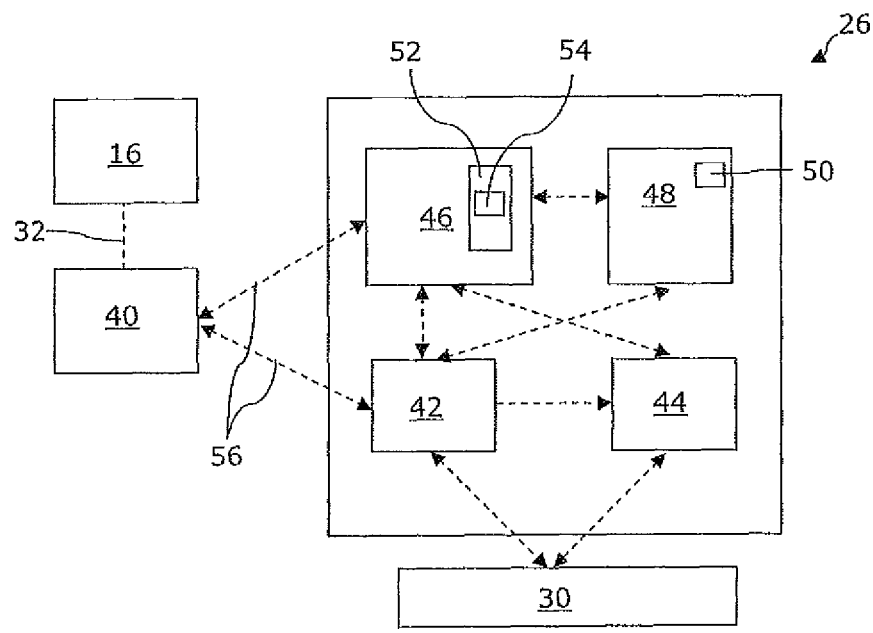
FIG. 2 illustrates a block diagram of a computer of the numerical control device of FIG. 1.

FIG. 2 illustrates a block diagram of the computer 26. The computer 26 includes an NC kernel (NCK) 40 (e.g., a system kernel) that controls real-time motion of the tool 12 along and about the motion axes 18 relative to the workpiece 14 (as shown in FIG. 1). The NCK 40 is connected to the actuators 16 of the tool 12 via the control line 32. The computer 26 includes a user interface 42 (e.g., a man machine control (MMC)), a graphic viewer 44, a memory 46 for storing data, and a monitoring module 48 that includes an optimization algorithm 50 stored therein.

Stored in the memory 46 is an NC control program 52, which includes a native path-describing NC data set 54 that is generated based on computer-aided design (CAD) data. The NC data set 54 therefore defines the desired tool path 34 of the tool 12 for processing the workpiece 14. The NCK 40 is connected to the user interface 42 and to the memory 46 via a bus 56 (e.g., a Multi-Point Interface (MPI) bus of the Simatic S7). The user interface 42 and the graphic viewer 44 are connected to the monitor 30.

Figure 3:
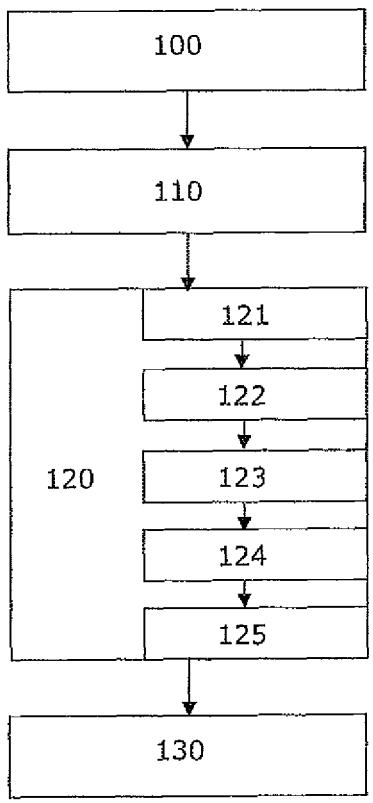
FIG. 3 illustrates a flow diagram of a method of sequentially processing workpieces.

FIG. 3 illustrates a method of sequentially processing multiple workpieces. For processing a workpiece 14 (e.g., a first workpiece), the path-describing NC data set 54 stored in the memory 46 of the computer 26 is called up (e.g., retrieved) and transferred via the bus 56 to the NCK 40 (step 100).

Next, the workpiece 14 is processed (step 110). For example, the NCK 40 controls a motion of the tool 12 according to the desired tool path 34 (as shown in FIG. 1) defined by the NC data set 54 and stored in the NCK via the actuators 16. During processing of the workpiece 14, the working distance 22 between the tool 12 and the workpiece 14 is continuously regulated (e.g., set or adjusted) to the desired distance defined in the NC control program 52. At the same time, axial positions of the tool 12 along and about respective motion axes 18 are detected by sensors (not shown in the drawings). In some examples, a typical sampling interval for detecting the axial positions of the tool 12 may be approximately 12 ms. The detected axial positions are stored by the NCK 40 in the memory 46 of the computer 26.

Upon completing processing of the workpiece 14, the path-describing NC data set 54 is optimized based on the stored axial positions of the tool 12 (step 120). For example, the monitoring module 48 reads out the axial positions of the tool 12 stored in the memory 46 (sub-step 121) and calculates the actual tool path 36 travelled by the tool 12 during the processing of the workpiece 14 (sub-step 122).

Next, a path difference (e.g., a path deviation, as indicated by the arrow 38 in FIG. 1) between the actual tool path 36 and the desired tool path 34 is determined and compared with a defined path deviation stored in the NC device 24 (sub-step 123). If the defined path deviation is exceeded, an optimized desired tool path 34' that is operationally optimized for processing the previously processed workpiece 14 is calculated by the monitoring module 48 according to the optimization algorithm 50 (sub-step 124). The path-encoding NC data set 54 of the calculated, optimized desired tool path 34' is stored in the user interface 42 and transferred to the NCK 40 via the bus 56 for processing another (e.g., a next) workpiece 14 (sub-step 125). Processing of another workpiece 14 that is structurally identical to the workpiece 14 is carried out according to the optimized NC data set 54 (i.e., with the tool 12 being moved according to the optimized desired tool path 34').

The path deviation 38 of the actual tool path 36 from the desired tool path 34 of the tool 12 is determined after each processing cycle of the NC control program 52 (i.e., after processing each workpiece 14). Accordingly, if a path deviation 38 is detected, the desired tool path 34 is optimized again. The graphic viewer 44 of the computer 26 may be launched to visualize the path deviation 38 of the actual tool path 36 from the desired tool path 34. For example, the graphic viewer 44 loads the axial positions of the tool 12 that were stored in the memory 46 during processing of the previously processed workpiece 14 and displays those axial positions, or an actual motion path 36 generated therefrom, together with the original (e.g., native) CAD-generated desired tool path 34 on the monitor 30. In addition, a path deviation trend determined from the path deviations 38 via the monitoring module 48 can be graphically displayed on the monitor 30. The path deviation trend can be updated after processing each workpiece. Furthermore, the desired tool path 34 can be corrected via graphic support on the monitor 30.

A number of embodiments have been described. Nevertheless, it will be understood that various modifications may be made without departing from the spirit and scope of the disclosure. Accordingly, other embodiments are within the scope of the following claims.

The invention claimed is:

1. A method of laser processing a plurality of structurally identical workpieces using a numerically controlled workpiece processing apparatus, comprising:
   laser processing a first workpiece of the plurality of structurally identical workpieces according to a first desired tool path specified for a laser tool of the numerically controlled workpiece processing apparatus by closed-loop controlling a working distance between the tool and the first workpiece to achieve a defined desired distance, such that when laser processing the first workpiece, the laser tool is moved along a distance-controlled actual tool path;
   optimizing the first desired tool path for a second workpiece of the plurality of structurally identical workpieces based on the distance-controlled actual tool path associated with the first workpiece to provide a second desired tool path;
   laser processing the second workpiece according to the second desired tool path;
   determining that the laser processing of the second workpiece meets a defined quality metric; and
   for each additional workpiece of the plurality of structurally identical workpieces processed after the second workpiece, compensating for progressive wear of an upstream tool used to process the plurality of structurally identical workpieces such that dynamic geometric errors generated in one or more of the plurality of structurally identical workpieces over time are compensated by continuing to:
      optimize a previous desired tool path for a next workpiece based on a previous distance-controlled actual tool path associated with a previous workpiece to provide a next desired tool path for the next workpiece, and laser process the next workpiece according to the next desired tool path.

2. The method according to claim 1, further comprising:
detecting axial positions of the laser tool along and/or about motion axes of the laser tool as the laser tool is moved along the distance-controlled actual tool path; and
determining the distance-controlled actual tool path based on the axial positions.

3. The method according to claim 1, wherein the second desired tool path is optimized such that the second desired tool path corresponds to the distance-controlled actual tool path along which the laser tool is moved during processing of the first workpiece.

4. The method according to claim 1, wherein the first and second desired tool paths are optimized in a manner such that the first and second desired tool paths are encoded by a number and/or a spatial sequence of path interpolation points that are based on an operationally optimized motion of the laser tool.

5. The method according to claim 1, wherein the first and second desired tool paths are optimized automatically via a numerical control (NC) device.

6. The method according to claim 1, further comprising:
determining a path deviation between the distance-controlled actual tool path and the first desired tool path; and
optimizing the first desired tool path.

7. The method according to claim 6, further comprising assessing a workpiece quality of the first workpiece based on the path deviation.

8. The method according to claim 6, further comprising determining a path deviation trend from a plurality of path deviations.

9. The method according to claim 8, further comprising providing an indication of the progressive wear of the upstream processing tool by graphically displaying the path deviation trend.

10. The method according to claim 1, further comprising graphically displaying a virtual workpiece image that is generated from computer-aided (CAD) design data related to the first workpiece and stored in a control system of the numerically controlled workpiece processing apparatus, and/or graphically displaying at least a portion of the first desired tool path and/or the distance-controlled actual tool path.

11. The method according to claim 1, wherein the working distance between the laser tool and the first workpiece is measured in a non-contacting manner.

12. The method according to claim 11, wherein the working distance between the laser tool and the first workpiece is measured optically or capacitively.

13. The method according to claim 1, further comprising assessing a workpiece quality of the first workpiece based on the distance-controlled actual tool path.

14. The method according to claim 1, further comprising determining that the defined quality metric is met by determining that a path deviation between a distance-controlled actual tool path associated with the second workpiece and the second desired tool path is less than a defined path deviation.

15. A laser processing apparatus, comprising:
a laser tool;
a distance measuring device associated with the laser tool and configured to measure a working distance between the laser tool and a workpiece; and
a numerical control (NC) device programmed to execute a method of laser processing a plurality of structurally identical workpieces, the method comprising:
laser processing a first workpiece of the plurality of structurally identical workpieces according to a first desired tool path specified for the laser tool by closed-loop controlling the working distance between the laser tool and the first workpiece to achieve a defined desired distance, such that when laser processing the first workpiece, the laser tool is moved along a distance-controlled actual tool path;
optimizing the first desired tool path for a second workpiece of the plurality of structurally identical workpieces based on the distance-controlled actual tool path associated with the first workpiece to provide a second desired tool path;
laser processing the second workpiece according to the second desired tool path;
determining that the laser processing of the second workpiece meets a defined quality metric; and
for each additional workpiece of the plurality of structurally identical workpieces processed after the second workpiece, compensating for progressive wear of an upstream tool used to process the plurality of structurally identical workpieces such that dynamic geometric errors generated in one or more of the plurality of structurally identical workpieces over time are compensated by continuing to:
optimize a previous desired tool path for a next workpiece based on a previous distance-controlled actual tool path associated with a previous workpiece to provide a next desired tool path for the next workpiece, and
laser process the next workpiece according to the next desired tool path.

16. The laser processing apparatus according to claim 15, wherein the NC device is configured to optimize the second desired tool path such that the second desired tool path corresponds to the distance-controlled actual tool path along which the laser tool is moved during processing of the first workpiece.

17. The laser processing apparatus according to claim 15, wherein the NC device is configured to optimize the first and second desired tool paths in a manner such that the first and second desired tool paths are encoded by a number and/or a spatial sequence of path interpolation points that are based on an operationally optimized motion of the laser tool.

18. The laser processing apparatus according to claim 15, wherein the NC device is configured to automatically optimize the first and second desired tool paths.

19. The laser processing apparatus according to claim 15, wherein the distance measuring device is a non-contact sensor.

20. The laser processing apparatus according to claim 19, wherein the distance measuring device is an optical or capacitive sensor.

21. The laser processing apparatus according to claim 15, wherein the method executed by the NC device further comprises determining that the defined quality metric is met by determining that a path deviation between a distance-controlled actual tool path associated with the second workpiece and the second desired tool path is less than a defined path deviation.

22. A method of laser processing a plurality of structurally identical workpieces using a numerically controlled workpiece processing apparatus, comprising:

laser processing a first workpiece of the plurality of structurally identical workpieces according to a first desired tool path specified for a laser tool of the numerically controlled workpiece processing apparatus by closed-loop controlling a working distance between the laser tool and the first workpiece to achieve a defined desired distance, such that when laser processing the first workpiece, the laser tool is moved along a distance-controlled actual tool path;

optimizing the first desired tool path for a second workpiece of the plurality of structurally identical workpieces based on the distance-controlled actual tool path associated with the first workpiece to provide a second desired tool path;

laser processing the second workpiece according to the second desired tool path; and for each additional workpiece of the plurality of structurally identical workpieces processed after the second workpiece, compensating for progressive wear of an upstream tool used to process the plurality of structurally identical workpieces such that dynamic geometric errors generated in one or more of the plurality of structurally identical workpieces over time are compensated by continuing to:

determine whether there is a defined path deviation between a previous distance-controlled actual tool path and a previous desired tool path associated with a previous workpiece, and if there is a defined path deviation:

optimize the previous desired tool path for a next workpiece based on the previous distance-controlled actual tool path associated with the previous workpiece to provide a next desired tool path, and laser process the next workpiece according to the next desired tool path.

\* \* \* \* \*